US011384194B2

(12) United States Patent
Kolb et al.

(10) Patent No.: US 11,384,194 B2
(45) Date of Patent: Jul. 12, 2022

(54) REACTIVE ADHESIVES BASED ON BLOCK COPOLYMERS

(71) Applicant: Evonik Operations GmbH, Essen (DE)

(72) Inventors: Nicolai Kolb, Recklinghausen (DE); Gabriele Brenner, Dülmen (DE); Bernhard Schleimer, Marl (DE)

(73) Assignee: Evonik Operations GmbH, Essen (DE)

( * ) Notice: Subject to any disclaimer, the term of this patent is extended or adjusted under 35 U.S.C. 154(b) by 226 days.

(21) Appl. No.: 16/760,086

(22) PCT Filed: Oct. 31, 2018

(86) PCT No.: PCT/EP2018/079873
§ 371 (c)(1),
(2) Date: Apr. 29, 2020

(87) PCT Pub. No.: WO2019/086538
PCT Pub. Date: May 9, 2019

(65) Prior Publication Data
US 2020/0377641 A1   Dec. 3, 2020

(30) Foreign Application Priority Data

Nov. 3, 2017  (EP) .................................... 17199866

(51) Int. Cl.
| | | |
|---|---|---|
| *C08G 18/42* | (2006.01) | |
| *C08G 18/69* | (2006.01) | |
| *C08G 18/22* | (2006.01) | |
| *C08G 18/12* | (2006.01) | |
| *C08G 18/76* | (2006.01) | |
| *C08G 63/08* | (2006.01) | |
| *C09J 175/06* | (2006.01) | |

(52) U.S. Cl.
CPC .......... *C08G 18/222* (2013.01); *C08G 18/12* (2013.01); *C08G 18/4238* (2013.01); *C08G 18/698* (2013.01); *C08G 18/7671* (2013.01); *C08G 63/08* (2013.01); *C09J 175/06* (2013.01); *C08G 2170/20* (2013.01)

(58) Field of Classification Search
CPC . C08G 18/698; C08G 18/222; C08G 18/4238
See application file for complete search history.

(56) References Cited

U.S. PATENT DOCUMENTS

| | | | | |
|---|---|---|---|---|
| 4,727,099 A | * | 2/1988 | Vasta | ................. C08G 18/3262 528/282 |
| 10,087,349 B2 | | 10/2018 | Brenner et al. | |
| 10,202,488 B2 | | 2/2019 | Cron et al. | |
| 10,246,617 B2 | | 4/2019 | Cron et al. | |
| 10,385,240 B2 | | 8/2019 | Ramon-Gimenez et al. | |
| 10,435,602 B2 | | 10/2019 | Cron et al. | |
| 2013/0338324 A1 | | 12/2013 | Beierlein et al. | |
| 2017/0240684 A1 | * | 8/2017 | Eling | ................. C08G 18/4269 |
| 2018/0291153 A1 | | 10/2018 | Cron et al. | |
| 2019/0112511 A1 | | 4/2019 | Kolb et al. | |
| 2019/0153258 A1 | | 5/2019 | Kolb et al. | |
| 2019/0382681 A1 | | 12/2019 | Maier et al. | |

FOREIGN PATENT DOCUMENTS

| | | |
|---|---|---|
| EP | 0 267 053 A2 | 5/1988 |
| EP | 2 492 292 A1 | 8/2012 |
| JP | 2011 046912 | 3/2011 |
| WO | 2013/177266 A1 | 11/2013 |
| WO | 2016/026807 A1 | 2/2016 |
| WO | 2017/194210 A1 | 11/2017 |

OTHER PUBLICATIONS

German language International Search Report dated Feb. 21, 2019 in PCT/EP2018/079873 (4 pages).
German language Written Opinion dated Feb. 21, 2019 in PCT/EP2018/079873 (9 pages).
International Search Report dated Feb. 21, 2019 in PCT/EP2018/079873 (3 pages).
Kolb et al., U.S. Appl. No. 16/638,541, filed Feb. 12, 2020.

* cited by examiner

*Primary Examiner* — Michael L Leonard
(74) *Attorney, Agent, or Firm* — Taylor English Duma LLP; Philip P. McCann

(57) ABSTRACT

The present invention relates to a composition comprising the reaction product of a block copolymer based on OH-functional polyolefin which is unhydrogenated, preferably polybutadiene, and cyclic esters in the form of a polyol having at least 1.8, preferably at least two, OH groups and at least one isocyanate compound having at least two isocyanate groups, which is notable in that the composition includes at least 0.0001% to 40% by weight of titanium and has a content of free isocyanate groups of at least 0.1% by weight based on the overall composition, to a process for preparation thereof and to the use of the composition for bonding of substrates.

18 Claims, No Drawings

REACTIVE ADHESIVES BASED ON BLOCK COPOLYMERS

CROSS REFERENCE TO RELATED APPLICATIONS

This application is a 35 U.S.C. § 371 U.S. national phase entry of International Application No. PCT/EP2018/079873 having an international filing date of Oct. 31, 2018, which claims the benefit of European Application No. 17199866.9 filed Nov. 3, 2017, each of which is incorporated herein by reference in its entirety.

FIELD

The present invention relates to a composition comprising the reaction product of a block copolymer based on OH-functional unhydrogenated polyolefin, preferably OH-functional polybutadiene, and cyclic esters in the form of a polyol having at least 1.8 OH groups and at least one isocyanate compound having at least two isocyanate groups, which is notable in that the composition includes 0.0001% to 40% by weight of titanium and has a content of free isocyanate groups of at least 0.1% by weight based on the overall composition, to a process for preparation thereof and to the use of the composition for production of adhesives and sealants, and to the use of these adhesives and sealants for bonding of substrates.

BACKGROUND

Polyester polyols nowadays have many uses as raw materials, one being for production of adhesives and sealants. These adhesives and sealants may, for example, be thermoplastic or reactive hotmelt adhesives, 1K (one-pack) or 2K (two-pack) liquid adhesives, or epoxy systems. For reactive adhesive systems, the polyols are reacted, for example, generally with an excess of diisocyanates to give reactive, moisture-curing polymers (prepolymers). The reactive hotmelt adhesives are typically applied as a melt and have an initial strength. The reactive end groups result in a reaction with air humidity, such that the polymer cures further and subsequently can be melted again only with great difficulty, if at all.

Such reactive adhesive systems feature rapid curing, and also high formulation flexibility and a broad spectrum of application. For example, very good bonding of wood, textiles or metals is possible. However, a disadvantage is that very nonpolar materials, for example low-energy plastics such as polyethylene or polypropylene, generally cannot be bonded to reactive hotmelt adhesives based on polyesters because of poor wetting, without pretreatment of the surface. For such bonds, it is customary to utilize thermoplastic or silane-modified polyolefins. The problem here is that polyolefins are incompatible or immiscible with the polyester-based systems. It is likewise the case that the curing of such polyolefin-based adhesives typically takes longer.

It is likewise not possible for contaminated, for example oily, surfaces to be bonded with reactive hotmelt adhesives based on polyesters without preliminary cleaning. For adhesive bonds of this kind, it is possible to use polybutadienes for example. Here too, the problem is that polybutadienes are not compatible or miscible with polyester-based systems.

The disadvantages can be overcome by the use of block copolymers where the different components are bonded to one another via covalent bonds in order to obtain compatibility.

WO 2013/177266 describes copolymers that can be used as oxygen scavengers and the preparation thereof. The copolymers are preferably formed from caprolactone and hydroxyl-terminated polybutadiene.

WO 2016/026807 describes polyester-modified polybutadienediols for preparation of polyurethane elastomers and thermoplastic polyurethanes. These polyurethane elastomers and thermoplastic polyurethanes can be processed, for example, to films, tubes or cable sheaths and be used for production of rollers, sieves, filters, industrial and sports floors or adhesives.

In addition, block copolymers formed from hydroxyl-terminated polybutadiene and cyclic esters and the preparation thereof are described extensively in the academic literature. For instance, the reaction of hydroxyl-functional polybutadiene with lactide (Macromolecules 2013, 46, 7387-7398) or with caprolactone (Macromolecules 2006, 39, 711-719) as cyclic esters with a tin catalyst has been described. It is likewise possible to deprotonate hydroxyl-terminated polybutadiene with butyllithium to give the alkoxide, which then polymerizes with caprolactone to give the corresponding block copolymer (e-Polymers 2009, vol 032).

In addition, it is also possible to utilize hydroxyl-functional polyisoprene as a further OH-functional polyolefin for preparation of corresponding block copolymers. For instance, the preparation of corresponding block copolymers based on OH-functional polyisoprene and lactide using an aluminium catalyst has been described (Macromol. Rapid Commun. 2000, 21, 1317-1322 & Biomacromolecules 2003, 4, 216-223).

In general, the selection of possible catalysts for polymerization of cyclic esters via OH-functional initiators is virtually unlimited. Chem. Rev. 2004, 104, 6147-6176, for example, describes numerous catalysts that can be utilized for ring-opening polymerization of lactide or glycolide as cyclic esters.

By contrast, there has not yet been any description of a reaction of block copolymers based on OH-functional polyolefin and cyclic esters with an excess of diisocyanate for preparation of NCO-terminated prepolymers and, more particularly, of the effect of the catalysts utilized for preparation of the block copolymers on this further reaction.

SUMMARY

The problem addressed by the present invention was therefore that of providing compositions comprising the reaction product of a block copolymer based on OH-functionalized polyolefin, preferably OH-functionalized polybutadiene, and cyclic esters in the form of a polyol having at least 1.8 OH groups and at least one isocyanate compound having at least two isocyanate groups, which have a low viscosity after the reaction with an excess of diisocyanate.

It has been found that, surprisingly, this problem is solved when the composition includes from 0.0001% by weight to 40% by weight of titanium and has a content of free isocyanate groups of at least 0.1% by weight, based on the overall composition.

The present invention therefore provides the compositions that are described hereinafter and claimed in the claims.

The present invention likewise provides a process for preparing the compositions according to the invention.

The present invention also provides for the use of the compositions according to the invention for production of adhesives and sealants, and for the use thereof for bonding of substrates and use as sealants.

The compositions according to the invention have the advantage that free NCO groups are present in the composition. Such NCO groups present in free form are highly reactive and are a fundamental prerequisite for moisture-curing reactive adhesives.

The compositions according to the invention also have the advantage that they have a low viscosity in spite of an excess of NCO groups. In addition, the compositions according to the invention have good processing stability, processing stability being defined by the rise in the viscosity during temperature-controlled storage.

DETAILED DESCRIPTION

The compositions according to the invention, the process according to the invention for production thereof and the use according to the invention of the compositions are described by way of example hereinafter without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Where figures are given in percent hereinafter, these are percentages by weight unless stated otherwise. Where averages, for example molar mass averages, are reported hereinafter, these are the numerical average unless stated otherwise. Where properties of a material are referred to hereinafter, for example viscosities or the like, these are the properties of the material at 25° C., unless stated otherwise. Where chemical (empirical) formulae are used in the present invention, the specified indices may be not only absolute numbers but also average values. The indices relating to polymeric compounds are preferably average values.

In the context of the present invention, OH-functional polyolefins are understood to mean those polymers based on alkenes and/or polyenes as monomers. In the context of the present invention, the repeat units of the polyolefins consist exclusively of the elements carbon and hydrogen and include no aromatic structures. The polyolefins may contain any desired proportion of double bonds.

It is a feature of the compositions according to the invention comprising at least the reaction product of a block copolymer based on OH-functional, preferably OH-terminated, polyolefin which is unhydrogenated, preferably OH-functional, preferably OH-terminated, polybutadiene which is unhydrogenated, and cyclic esters in the form of a polyol having at least 1.8, preferably at least two, OH groups and at least one isocyanate compound having at least two isocyanate groups that the compositions include from 0.0001% to 40% by weight, preferably 0.0002% to 1% by weight and more preferably 0.001% to 0.1% by weight of titanium and have a content of free isocyanate groups of at least 0.1% by weight, preferably 0.5% to 10% by weight, more preferably of 1% to 5% by weight, based on the overall composition.

The titanium present in the composition according to the invention is in the form of titanium tetramethoxide, titanium tetraethoxide, titanium tetrapropoxide, titanium tetraisopropoxide, titanium tetra-n-butoxide, titanium tetra-t-butoxide, titanium tetraphenoxide, titanium oxide acetylacetonate, titanium acetylacetonate or titanium dialkoxide based on diols. Preferably, the titanium is not in the form of a compound having a ligand containing amino groups.

Preferably, the block copolymers used in accordance with the invention, based on OH-functional, preferably OH-terminated, polyolefin which is unhydrogenated, preferably OH-functional, preferably OH-terminated, polybutadiene which is unhydrogenated, are B(A)$_w$ block systems with A=polyester, with B=OH-functional, preferably OH-terminated, polyolefin which is unhydrogenated, preferably OH-functional, preferably OH-terminated, polybutadiene which is unhydrogenated, and with w≥1.8, preferably w≥2 to 5, more preferably w>2 to 3. The value of w reflects the functionality of the OH-functionalized, preferably terminated, polyolefin. In general, the functionality of the OH-functionalized, preferably terminated, polyolefin and hence w is in the range from 1.8 to 5, preferably in the range from 2 to 3.5, especially preferably in the range from 2 to 3. In the case that w=2, i.e. in the case of OH-functionalized, preferably terminated, polyolefins having a functionality of 2, the block copolymers are especially ABA triblock systems. In addition, block structures of the formula (AB)$_m$ are likewise possible, where m>1.

The block copolymers used in accordance with the invention, based on OH-functional, preferably OH-terminated, polyolefin which is unhydrogenated, preferably OH-functional, preferably OH-terminated, polybutadiene which is unhydrogenated, and cyclic esters can be described in more detail as B'(OA'—H)$_w$ systems with B'=polyolefin radical, was defined above and A'=polyester radical of the structure (I)

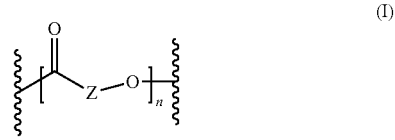

(I)

with Z=identical or different hydrocarbyl radicals, preferably —C$_5$H$_{10}$— and/or —C(CH$_3$)H— radical, more preferably —C$_5$H$_{10}$— radical and n=1-150, preferably 3 to 120. Preferably, B' is a polybutadiene radical containing or preferably consisting of the 1,3-butadiene-derived monomer units

(II)

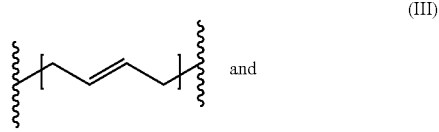

(III)

and

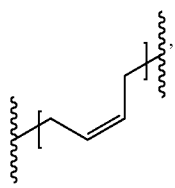

with the proviso that the monomer units (II), (III) and (IV) may be arranged in blocks or in random distribution and, based on the polybutadiene, the percentage of the repeat unit (II)=10 to 40 mole percent, preferably 15 to 30 mole percent and more preferably 20 to 25 mole percent, based on the repeat unit, (III)=40 to 85 mole percent, preferably 50 to 70 mole percent and more preferably 55 to 60 mole percent, and the proportion of the repeat unit (IV) is 5 to 40 mole percent, preferably 15 to 30 mole percent and more preferably 15 to 25 mole percent, where a square bracket in the chosen formula representation of the 1,3-butadiene-derived monomer units (II), (III) and (IV) present in the polybutadiene shows that the bond endowed with the respective square bracket does not end with a methyl group, for instance, but that the corresponding monomer unit is bonded via this bond to a further monomer unit or a hydroxyl group. Preferably, in addition to a proportion of up to 5 mole percent, based on the polybutadiene, one or more branching structures of the formula (V), (VI) or (VII)

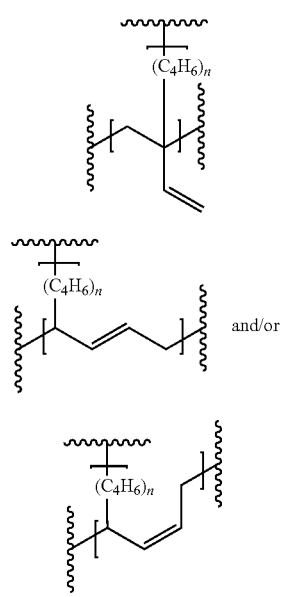

may be present, where "$(C_4H_6)n$" corresponds to a butadiene oligomer containing or preferably consisting of the repeat units (II), (III) and (IV). The weight ratio of the structures A' to B' is preferably from 1:19 to 19:1.

The isocyanate compound is preferably diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'-diisocyanate and diphenylmethane 2,4'-diisocyanate.

The composition of the invention may, as well as the reaction product of a block copolymer based on OH-functional polyolefin and cyclic esters in the form of a polyol having at least 1.8, preferably at least two, OH groups and at least one isocyanate compound, comprise further polyols or reaction products thereof that are obtained by reaction of the further polyols with di- or polyisocyanates, especially the aforementioned diisocyanates.

Examples of optional further polymers that may be present include polyester polyols, polyether polyols and any desired hydroxyl-functional components, or reaction products thereof. Any of these optional polyols may be chosen in principle.

Examples of optional further polyester polyols that may be used include liquid or solid, amorphous or (semi)crystalline polyester polyols having number-average molecular weights between 1000 g/mol and 30 000 g/mol, preferably between 2000 g/mol and 10 000 g/mol (calculated from the hydroxyl number), preference being given to using linear polyester polyols.

Optional polyether polyols used may be, for example, polyether diols or polyether triols.

Examples of these are, for example, homo- and copolymers of ethylene glycol, propylene glycol and/or butane-1,4-diol. The molecular weight (number average) of the polyether polyols added should preferably be within a range from 1000 g/mol to 10 000 g/mol, preferably between 2000 g/mol and 8000 g/mol.

Any optional hydroxyl-functional components used are preferably hydroxyl-functional polyolefins such as hydroxyl-functional polybutadienes, hydroxyl-functional polyisoprenes, hydroxyl-functional polycarbonates or hydroxyl-functional polyacrylates.

The compositions according to the invention may additionally contain up to 50% by weight, based on the overall composition, of further additives.

These additives may be, for example: non-OH-functionalized polymers, for example thermoplastic polyurethanes (TPUs) and/or polyacrylates and/or ethylene-vinyl acetate copolymers (EVA); pigments or fillers, for example talc, silicon dioxide, titanium dioxide, barium sulfate, calcium carbonate, carbon black or color pigments; tackifiers, for example rosins, hydrocarbon resins, phenolic resins, and ageing stabilizers and auxiliaries.

The compositions according to the invention may preferably be one-pack or two-pack, moisture-crosslinking or thermally crosslinking polyurethane adhesives.

The compositions according to the invention can be obtained in various ways. Preferably, the compositions according to the invention are obtained by the process according to the invention described hereinafter.

It is a feature of the process according to the invention for preparing a reaction product of a block copolymer based on OH-functional, preferably OH-terminated, polyolefin which is unhydrogenated, preferably OH-functional, preferably OH-terminated, polybutadiene which is unhydrogenated, and cyclic esters in the form of a polyol having at least 1.8, preferably at least two, OH groups and at least one isocyanate compound having at least two isocyanate groups that the reaction is effected in the presence of a titanium-comprising compound and a sufficient amount of isocyanate compound is used that the ratio of OH groups to isocyanate groups is from 1:1.1 to 1:5, preferably 1:1.5 to 1:3.

The titanium-comprising compound used is titanium tetramethoxide, titanium tetraethoxide, titanium tetrapropoxide, titanium tetraisopropoxide, titanium tetra-n-butoxide, titanium tetra-t-butoxide, titanium tetraphenoxide, titanium oxide acetylacetonate, titanium acetylacetonate or titanium dialkoxide based on diols. Preferably, the titanium is not in the form of a compound having a ligand containing amino groups.

Preferably, the titanium-comprising compound is used at the early stage of preparation of the block copolymer, preferably as a catalyst. The proportion of titanium in the reaction mixture is preferably from 0.0001% by weight to 1% by weight, preferably 0.001% to 0.1% by weight.

The block copolymers are preferably prepared by ring-opening reaction (or polymerization), preferably at temperatures of 20 to 250° C., preferably within a period of 0.1 to 20 hours. The ring-opening reaction can preferably be conducted in the melt or in the presence of solvents.

Preferably, cyclic esters used in the process according to the invention are $C_3$ lactones such as β-propiolactone, $C_4$ lactones such as β-butyrolactone or γ-butyrolactone, $C_5$ lactones such as 4-hydroxy-3-pentenoic acid-gamma-lactone, α-methylene-γ-butyrolactone, γ-methylene-γ-butyrolactone, 3-methyl-2(5H)-furanone, γ-valerolactone, δ-valerolactone, $C_6$ lactones such as δ-hexalactone, ϑ-caprolactone or γ-hexalactone, or further lactones such as 5-butyl-4-methyldihydro-2(3H)-furanone, δ-octanolactone, γ-phenyl-ϑ-caprolactone, oxacyclododecan-2-one, oxacyclotridecan-2-one, pentadecanolide, 16-hexadecanolide, γ-undecalactone, δ-undecalactone, γ-methylene-γ-butyrolactone or lactide or mixtures thereof, preferably ε-caprolactone and/or lactide.

In a particular embodiment, preference is given to using a mixture of c-caprolactone and lactide.

Preferably, in the process according to the invention, the cyclic ester used is at least ϑ-caprolactone and optionally lactide.

The hydroxyl-functional, preferably hydroxyl-terminated, polyolefin, preferably polybutadiene, used is preferably a polybutadiene containing or preferably consisting of the 1,3-butadiene-derived monomer units

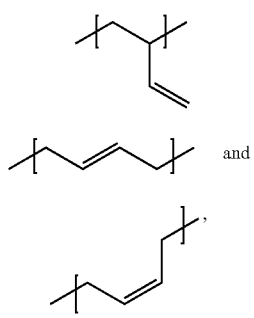

with the proviso that the monomer units (II), (III) and (IV) may be arranged in blocks or in random distribution and, based on the polybutadiene, the percentage of the repeat unit (II)=10 to 40 mole percent, preferably 15 to 30 mole percent and more preferably 20 to 25 mole percent, based on the repeat unit, (III)=40 to 85 mole percent, preferably 50 to 70 mole percent and more preferably 55 to 60 mole percent, and the proportion of the repeat unit (IV) is 5 to 40 mole percent, preferably 15 to 30 mole percent and more preferably 15 to 25 mole percent, where a square bracket in the chosen formula representation of the 1,3-butadiene-derived monomer units (II), (III) and (IV) present in the polybutadiene shows that the bond endowed with the respective square bracket does not end with a methyl group, for instance, but that the corresponding monomer unit is bonded via this bond to a further monomer unit or a hydroxyl group. Preferably, in addition to a proportion of up to 5 mole percent, based on the polybutadiene, one or more branching structures

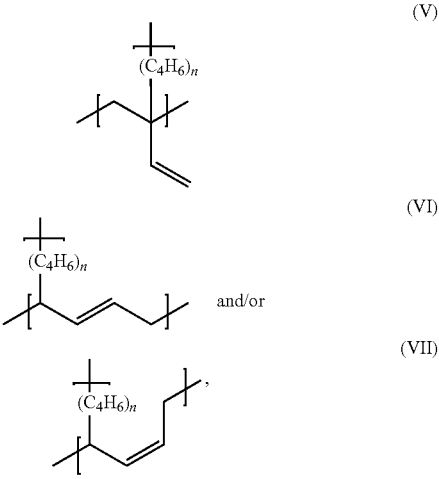

may be present, where "$(C_4H_6)_n$" corresponds to a butadiene oligomer containing or preferably consisting of the repeat units (II), (III) and (IV) and the respective chain ends are OH groups.

The number-average molecular weight, determined by gel permeation chromatography, of the hydroxyl-terminated polybutadienes is preferably from 500 to 10 000 g/mol, more preferably from 1000 to 5000 g/mol and especially preferably from 1500 to 4000 g/mol.

In addition, the polybutadiene may be in partly or fully hydrogenated form.

The hydroxyl-terminated polybutadienes used in accordance with the invention are preferably prepared by means of free-radical polymerization, for example by polymerization of 1,3-butadiene in the presence of hydrogen peroxide, water and an organic solvent. Suitable processes are described, for example, in EP 2 492 292.

The polybutadienes usable with preference in the context of the present invention are commercially available, for example in the form of POLYVEST® HT from Evonik Resource Efficiency GmbH.

The functionality of the OH-functional, preferably OH-terminated, polyolefins, preferably polybutadienes, used, which are unhydrogenated, is preferably in the range from 1.8 to 5, more preferably in the range from 2 to 3.5, and especially preferably in the range from 2 to 3.

It is possible to adjust the functionality of the OH-functional polyolefin and of the block copolymer obtained, for example, by the reaction of monoisocyanates with the OH groups.

An essential factor in the context of the present invention is the presence of OH groups for formation of the copolymers. These OH groups are preferably present at the chain end of the polybutadiene; in addition, further OH groups may be present along the chain in the OH-terminated polybutadienes. In the context of the present invention, the functionality is determined by the correlation of molecular weight with OHN.

The cyclic ester used in the process according to the invention is preferably at least ϑ-caprolactone and optionally lactide, and the hydroxy-functional polyolefin used is preferably a polybutadiene as described above.

The isocyanate compound used is preferably diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'-diisocyanate and diphenylmethane 2,4'-diisocyanate.

The process according to the invention is preferably used to prepare the compositions according to the invention. As well as the reaction products prepared in accordance with the invention, the compositions according to the invention may comprise further polyols or reaction products thereof that are obtained by reaction of the further polyols with di- or polyisocyanates, especially those mentioned above.

It may be advantageous here when the further polyols are mixed with the block copolymers based on OH-functional, preferably OH-terminated, polyolefin which may also be in partly or fully hydrogenated form, but is preferably unhydrogenated, preferably OH-functional, preferably OH-terminated, polybutadiene which may also be in partly or fully hydrogenated form, but is preferably unhydrogenated, and cyclic esters in the form of polyols before the reaction with the isocyanate compound(s) having at least two isocyanate groups.

Examples of optional further polyols that may be used include polyester polyols, polyether polyols and any hydroxyl-functional components. Any of these optional polyols may be chosen in principle.

Examples of optional further polyesters that may be used include liquid or solid, amorphous or (semi)crystalline polyesters having number-average molecular weights between 1000 g/mol and 30 000 g/mol, preferably between 2000 g/mol and 10 000 g/mol (calculated from the hydroxyl number), preference being given to using linear polyester polyols.

Examples of optional polyether polyols used may include polyether diols or polyether triols. Examples of these are, for example, homo- and copolymers of ethylene glycol, propylene glycol and/or butane-1,4-diol. The molecular weight (number average) of the polyether polyols added should preferably be within a range from 1000 g/mol to 10 000 g/mol, preferably between 2000 g/mol and 8000 g/mol.

Any optional hydroxyl-functional components used are preferably hydroxyl-functional polyolefins such as hydroxyl-functional polybutadienes, hydroxyl-functional polyisoprenes, hydroxyl-functional polyolefins, hydroxyl-functional polycarbonates or hydroxyl-functional polyacrylates.

The compositions according to the invention are particularly suitable for production of adhesive bonds of substrates and/or for vibration damping or sound insulation. Possible substrates to be bonded preferably include, for example, plastics, metals, types of wood, mineral substrates, for example asphalt, concrete, especially metallic substrates and textiles, and very particularly various plastics. The nature and extent of the bonding are unlimited.

The substrates are preferably oily substrates. Oily substrates are understood to mean those substrates which contain natural, synthetic or mineral oils on the surface. The oily substances may get onto or into the substrates as a result of processing steps (for example drawing greases, waxes, separating agents etc.), or they may get onto the surface from the substrate (for example oily types of wood, for example teak wood or meranti wood).

Preferably, the bonds are bonds in the wood and furniture industry (for example assembly bonding and the lamination of decorative films onto fiberboards), in the automotive sector (for example laminations of films or textiles onto door side parts, inner roof linings, seat manufacture and retainer bonds, installable components in the (semi-)structural sector, fiber-reinforced composite materials or/and metals), in the construction industry, shoe industry and textile industry (for example siliconized or hydrophobized textiles), and in window construction (for example for profile sheathing). In addition, the adhesives of the invention are suitable in the packaging industry, as sealants and as coating material.

The reaction products according to the invention are suitable both for use in one-pack systems and in two-pack systems.

In the case of the one-pack adhesives, the mixture is produced at a different time from the adhesive application, typically at a much earlier time. The application of the adhesive of the invention is followed by curing, for example by moisture or by thermally induced reaction of the co-reactants present in the adhesive. In the case of the two-pack adhesives, the mixture is produced directly prior to adhesive application.

The adhesive formulations (compositions) according to the invention can be applied by all known methods, for example extruder, bead, nozzle, spreading, dipping, injecting, pouring, rolling, spraying, printing, wiping, washing, tumbling, centrifuging, powder (electrostatic).

Even without further elaboration it is believed that a person skilled in the art will be able to make the widest use of the above description. The preferred embodiments and examples are therefore to be interpreted merely as a descriptive disclosure which is by no means limiting in any way whatsoever.

The subject matter of the present invention is elucidated in detail in the following examples, without any intention that the subject matter of the present invention be restricted to these.

Examples

Test methods:
1. Gel Permeation Chromatography

The number-average and weight-average molecular weight of the block copolymers used in the context of the present invention is determined to DIN 55672-1 by means of gel permeation chromatography in tetrahydrofuran as eluent and polystyrene for calibration. Polydispersity (U)=Mw/Mn.
2. OHN The block copolymers prepared have hydroxyl groups as end groups. The concentration of the OH groups is determined in accordance with DIN 53240-2 by titrimetric means in mg KOH/g of polymer.
3. Viscosity The viscosity of the block copolymers prepared and of the reaction products of block copolymer and diisocyanate was determined in accordance with DIN EN ISO 3219 in Pa·s using a rotary viscometer at the temperature specified in each case.
4. NCO Number The NCO number of the reaction products of block copolymer with diisocyanate prepared was determined in accordance with DIN EN 1242 by titrimetric means in % by weight.
Raw Materials Used:
POLYVEST® HT: hydroxyl-terminated polybutadiene from Evonik Resource Efficiency GmbH DYNACOLL 7360: hydroxyl-terminated polyester from Evonik Resource Efficiency GmbH ϑ-caprolactone (from BASF SE)

Lupranat® ME: diphenylmethane 4,4'-diisocyanate (MDI—from BASF SE)

Catalysts Used:

The catalysts used can be found in Table 1.

TABLE 1

Details of the catalysts used

| Name | IUPAC name (CAS No.) | Manufacturer |
|---|---|---|
| Zr(acac)$_4$ | Zirconium(IV) acetylacetonate (17501-44-9) | Merck Millipore |
| Al(acac)$_3$ | Aluminium acetylacetonate (13963-57-0) | Sigma Aldrich |
| Zn(acac)$_2$ | Bis(2,4-pentanedionato)zinc(II) (14024-63-6) | TCI Deutschland GmbH |
| Tytan TET | Titanium bis(triethanolamine) diisopropoxide (36673-16-2) | Borica Co., Ltd |
| Tytan TNBT | Titanium tetra-n-butoxide (5593-70-4) | Borica Co., Ltd |
| Ken-React TTS | Titanium triisostearoylisopropoxide (61417-49-0) | Kenrich Petrochemicals, Inc |
| TiO(acac)$_2$ | Titanium(IV) oxide bis(acetylacetonate) (14024-64-7) | abcr GmbH |

Example 1a-h

Preparation of the Block Copolymers 450 g of POLYVEST® HT (hydroxyl-terminated polybutadiene from Evonik Resource Efficiency GmbH) were blended with 1050 g of ϑ-caprolactone and the amount of catalyst specified in Table 1 under a nitrogen stream in a 2 l multineck flask with a reflux condenser. Subsequently, the mixture was heated under a constant nitrogen stream to 160° C. for 6 hours. The block copolymer prepared therefrom was analysed for complete conversion by GPC analysis and was subsequently usable without further workup operations for production of the reactive adhesive. The amounts used and the results of the testing of the block copolymers obtained can be found in Tables 2a and 2b.

Example 2a-h

Reacting the Block Copolymer with Diisocyanate

In a 500 ml flanged flask, 300 g of the block copolymers from Example 1a-h were dried under reduced pressure at 130° C. for 45 minutes. Thereafter, about 32 g of diphenylmethane 4,4'-diisocyanate (Lupranat® ME) were added in a molar OH/NCO ratio of 1:3.0 (the exact amount depends on the OHN of the block copolymer) and rapidly homogenized. For complete conversion of the co-reactants, the mixture was stirred under a protective gas atmosphere at 130° C. for 45 minutes. The moisture-curing hotmelt adhesive (RHM) was then analysed with respect to viscosity and NCO content and dispensed.

The amounts used and the results of the testing of the compositions (RHMs) obtained can be found in Tables 2a and 2b.

TABLE 2a

Amounts of the substances used in Examples 1a-h and 2a-h and results of the testing

| Block copolymer properties | | Example 1a (comp.) | Example 1b (comp.) | Example 1c (comp.) | Example 1d (inventive) |
|---|---|---|---|---|---|
| Catalyst (% by wt.) | | Zr(acac)$_4$ (0.02) | Al(acac)$_3$ (0.02) | Zn(acac)$_2$ (0.02) | TYTAN TET (0.005) |
| Active metal | | Zr | Al | Zn | Ti |
| OHN | mgKOH/g | 14 | 14 | 17 | 14 |
| Viscosity (80° C.) | Pa · s | 12.4 | 11.8 | 8.3 | 14.5 |
| GPC M$_n$ | g/mol | 9200 | 11500 | 12400 | 7900 |
| GPC M$_w$ | g/mol | 23000 | 22800 | 21300 | 22600 |
| RHM properties (after reaction with MDI) | | Example 2a (comp.) | Example 2b (comp.) | Example 2c (comp.) | Example 2d (inventive) |
| Viscosity (130° C.) | Pa · s | 72.5 | 76.9 | 334 | 66.7 |
| NCO content | % | 1.7 | 1.7 | 2.2 | 1.8 |

TABLE 2b

Amounts of the substances used in Examples 1a-h and 2a-h and results of the testing

| Block copolymer properties | | Example 1e (inventive) | Example 1f (inventive) | Example 1g (inventive) | Example 1h (inventive) |
|---|---|---|---|---|---|
| Catalyst (% by wt.) | | TYTAN TNBT (0.005) | TYTAN TNBT (0.02) | Ken-React (0.005) | TiO(acac)$_2$ (0.005) |
| Active metal | | Ti | Ti | Ti | Ti |
| OHN | mgKOH/g | 15 | 15 | 16 | 15 |
| Viscosity (80° C.) | Pa · s | 13.0 | 13.0 | 13.0 | 12.6 |
| GPC M$_n$ | g/mol | 8000 | 7000 | 7700 | 7400 |
| GPC M$_w$ | g/mol | 23200 | 23300 | 23000 | 23000 |
| RHM properties (after reaction with MDI) | | Example 2e (inventive) | Example 2f (inventive) | Example 2g (inventive) | Example 2h (inventive) |
| Viscosity (130° C.) | Pa · s | 47.0 | 42.0 | 27.5 | 38.5 |
| NCO content | % | 2.0 | 2.1 | 2.2 | 1.8 |

As can be seen from Table 2, the different catalysts examined do not have any significant effect on the preparation of the block copolymer with regard to molecular weight, viscosity and OHN (Example 1a-h). However, the titanium-containing RHMs according to the invention (Examples 2d-2h) have a much lower viscosity than those that contain a different metal (Examples 2a-2c).

Example 3a-b

Production of RHM Formulations

A 500 ml flanged flask was charged with 150 g of block copolymer as polyol and 150 g of DYNACOLL 7360, and then the contents were blended under reduced pressure at 130° C. for 45 minutes and dried. Thereafter, MDI was added in a molar OH/NCO ratio of 1:2.5 and the mixture was homogenized rapidly. For complete conversion of the co-reactants, the mixture was stirred under a protective gas atmosphere at 130° C. for 45 minutes. The moisture-curing hotmelt adhesive (RHM) was then analysed with respect to viscosity and NCO content and dispensed.

The results of the testing of the compositions (RHMs) obtained can be found in Table 3.

TABLE 3

Effect of the catalyst in RHM blends

| Polyol | Example 3a (comparative) | Example 3b (inventive) |
|---|---|---|
| Example 1c polyol | 150 g | |
| Example 1e polyol | | 150 g |
| DYNACOLL 7360 | 150 g | 150 g |
| Reaction with MDI - OH:NCO 1:2.5 | | |
| RHM properties | | |
| Viscosity after preparation | 16.9 Pa · s at 130° C. | 11.2 Pa · s at 130° C. |
| Viscosity after storage at 130° C. for 8 h | 83 Pa · s at 130° C. | 22 Pa · s at 130° C. |
| Viscosity after storage at 130° C. for 24 h | 151 Pa · s at 130° C. | 55 Pa · s at 130° C. |
| Rise in viscosity after storage at 130° C. for 24 h | 793% | 390% |
| NCO content after RHM production | 2.4% by weight | 2.3% by weight |

Result: It is clearly apparent that, even in a blend with further polyols, the block copolymers according to the invention containing titanium, in the form of an RHM, have a distinct improvement in viscosity after RHM production and especially a distinct improvement in storage stability during temperature-controlled storage.

The invention claimed is:

1. A composition comprising the reaction product of a block copolymer based on OH-functional polyolefins, which are unhydrogenated and cyclic esters in the form of a polyol having at least 1.8 OH groups and at least one isocyanate compound having at least two isocyanate groups, wherein the composition includes at least 0.0001% to 40% by weight of titanium and has a content of free isocyanate groups of at least 0.1% by weight based on the overall composition, wherein the titanium is in the form of titanium tetramethoxide, titanium tetraethoxide, titanium tetrapropoxide, titanium tetraisopropoxide, titanium tetra-n-butoxide, titanium tetetra t-butoxide, titanium tetraphenoxide, titanium oxide acetylacetonate, titanium acetylacetonate or titanium dialkoxide based on diols; and wherein the block copolymer has the formula B'(OA'-H)$_w$ with B'=polyolefin radical; and wherein the polyolefin radical B' is a polybutadiene radical containing a 1,3-butadiene-derived monomer units

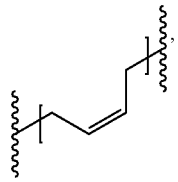

(II)

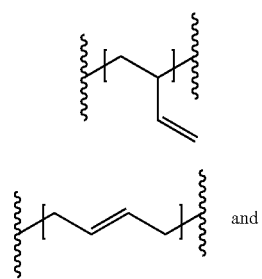 and (III)

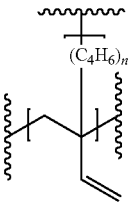

(IV)

wherein the monomer units (II), (III) and (IV) are in blocks or in random distribution and, based on the polybutadiene, the percentage of the repeat unit (II)=10 to 40 mole percent, (III)=40 to 85 mole percent, (IV) is 5 to 40 mole percent, where a square bracket in the chosen formula representation of the 1,3-butadiene-derived monomer units (II), (III) and (IV) present in the polybutadiene shows that the bond endowed with the respective square bracket and the corresponding monomer unit is bonded via this bond to a further monomer unit or a hydroxyl group; and wherein A'=polyester radical of the structure (I)

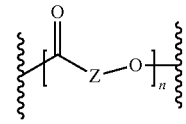

(I)

with Z=identical or different hydrocarbyl radicals and n=1-150.

2. The composition according to claim 1, wherein, in the polyolefin radical B', in addition to a proportion of up to 5 mole percent, based on the polybutadiene, one or more branching structures of the formula (V), (VI) or (VII)

(V)

(VI)

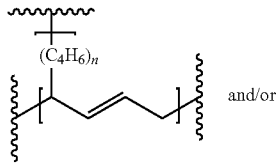 and/or (VII)

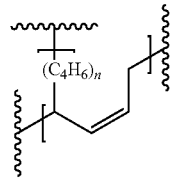

are present, where "(C$_4$H$_6$)$_n$" corresponds to a butadiene oligomer consisting of the repeat units (II), (III) and (IV).

3. The composition according to claim 1, wherein the isocyanate compound is selected from the group consisting of diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof.

4. The composition according to claim 1, wherein the composition further comprises a one-pack or a two-pack, moisture-crosslinking or thermally crosslinking polyurethane adhesives.

5. A process for preparing a reaction product of a block copolymer based on OH-functional polyolefin which is in unhydrogenated form and a cyclic ester in the form of a polyol having at least 1.8 OH groups and at least one isocyanate compound having at least two isocyanate groups, wherein the reaction is effected in the presence of a titanium-comprising catalyst and a sufficient amount of isocyanate compound is used that the ratio of OH groups to isocyanate groups is from 1:1.1 to 1:5, wherein the titanium is in the form of titanium tetramethoxide, titanium tetraethoxide, titanium tetrapropoxide, titanium tetraisopropoxide, titanium tetra-n-butoxide, titanium tetra-t-butoxide, titanium tetraphenoxide, titanium oxide acetylacetonate, titanium acetylacetonate or titanium dialkoxide based on diols, and wherein the hydroxyl-functional polyolefin used is a polybutadiene containing a 1,3-butadiene-derived monomer units

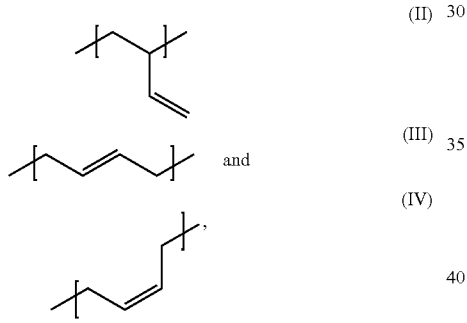

(II)

(III) and (IV)

wherein the monomer units (II), (Ill) and (IV) are blocks or in random distribution and, based on the polybutadiene, the percentage of the repeat unit (II)=10 to 40 mole percent, (Ill)=40 to 85 mole percent, (IV) is 5 to 40 mole percent, where a square bracket in the chosen formula representation of the 1,3-butadiene-derived monomer units (II), (Ill) and (IV) present in the polybutadiene shows that the bond endowed with the respective square bracket and the corresponding monomer unit is bonded via this bond to a further monomer unit or a hydroxy 1 group, and optionally, in addition to a proportion of up to 5 mole percent based on the polybutadiene, one or more branching structures

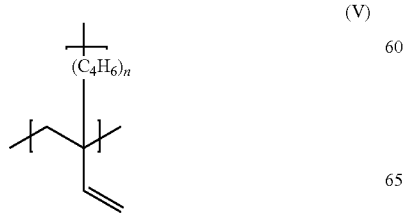

(V)

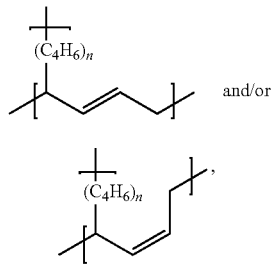

(VI)

and/or (VII)

are present, where "$(C_4H_6)_n$" corresponds to a butadiene oligomer containing the repeat units (II), (Ill) and (IV) and the respective chain ends are OH groups.

6. The process according to claim 5, wherein the hydroxyl-functional polyolefin used is a polybutadiene containing the 1,3-butadiene-derived monomer units

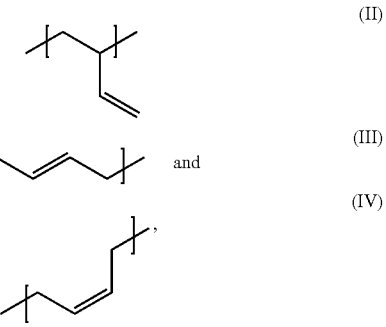

(II)

(III) and (IV)

wherein the monomer units (II), (Ill) and (IV) may be arranged in blocks or in random distribution and, based on the polybutadiene, the percentage of the repeat unit (II)=10 to 40 mole percent, based on the repeat unit, (Ill)=40 to 85 mole percent, and the proportion of the repeat unit (IV) is 5 to 40 mole percent, where a square bracket in the chosen formula representation of the 1,3-butadiene-derived monomer units (II), (Ill) and (IV) present in the polybutadiene shows that the bond endowed with the respective square bracket does not end with a methyl group, for instance, but that the corresponding monomer unit is bonded via this bond to a further monomer unit or a hydroxy 1 group, and optionally, in addition to a proportion of up to 5 mole percent based on the polybutadiene, one or more branching structures

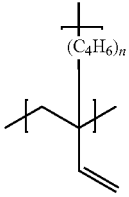

(V)

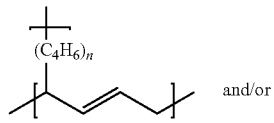

(VI)

and/or

-continued

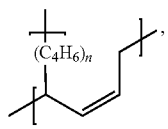
(VII)

are present, where "$(C_4H_6)_n$" corresponds to a butadiene oligomer containing the repeat units (II), (III) and (IV) and the respective chain ends are OH groups.

7. The process according to claim 5, wherein the cyclic ester comprises E-caprolactone and additionally optionally lactide.

8. The process according to claim 5, wherein the isocyanate compound used is selected from the group consisting of diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof.

9. A composition made by the process according to claim 5.

10. A bonding composition for production of adhesive bonds of substrates for sound insulation or vibration damping, the bonding composition comprising the composition according to claim 1.

11. The bonding composition according to claim 10, wherein the adhesive bonds of substrates for sound insulation or vibration damping are oily substrates.

12. The composition according to claim 1, wherein the block copolymer has the formula $B'(OA'-H)_w$-with $B'$=polyolefin radical, $w \geq 1.8$ and $A'$=polyester radical of the structure (I)

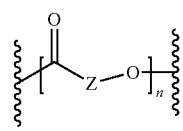
(I)

with $Z=C_5H_{10}$-radical and $n=1$-150.

13. The composition according to claim 1, wherein the block copolymer has the formula $B'(OA'-H)_w$-with $B'$=polyolefin radical, $w \geq 1.8$ and $A'$=polyester radical of the structure (I)

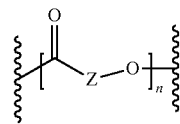
(I)

with $Z=-C_5H_{10}$-radical and $n=1$-150.

14. The composition according to claim 1, wherein the isocyanate compound is selected from the group consisting of diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'diisocyanate and diphenylmethane 2,4'-diisocyanate.

15. The composition according to claim 1, wherein the composition comprises one-pack or two-pack, moisture-crosslinking or thermally crosslinking polyurethane adhesives.

16. The composition according to claim 1, wherein the isocyanate compound is selected from the group consisting of diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'diisocyanate and diphenylmethane 2,4'-diisocyanate.

17. The composition according to claim 1, wherein the composition comprises one-pack or two-pack, moisture-crosslinking or thermally crosslinking polyurethane adhesives.

18. The process according to claim 5, wherein the isocyanate compound used is selected from the group consisting of diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'diisocyanate and diphenylmethane 2,4'-diisocyanate.

* * * * *

UNITED STATES PATENT AND TRADEMARK OFFICE
CERTIFICATE OF CORRECTION

PATENT NO. : 11,384,194 B2
APPLICATION NO. : 16/760086
DATED : July 12, 2022
INVENTOR(S) : Nicolai Kolb It is certified that error appears in the above-identified patent and that said Letters Patent is hereby corrected as shown below:

In the Claims

Column 17,
Line 13, "E-caprolactone" should read -- ε-caprolactone --.
Line 43, "Z = -$C_5H_{10}$-radical and n=1-150" should read -- Z = -$C_5H_{10}$- or -$C(CH_3)H$-radical and n=1-150 --.
Line 45, "B'(0A'-H)w-" should read -- B'(OA'-H)w- --.

Signed and Sealed this
Ninth Day of August, 2022

Katherine Kelly Vidal
*Director of the United States Patent and Trademark Office*